United States Patent [19]

Lamb

[11] 4,257,071
[45] Mar. 17, 1981

[54] APPARATUS FOR DIGITIZING OPTICAL IMAGES

[76] Inventor: Reginald T. Lamb, 601 Leahy, Apt. 206, Redwood City, Calif. 94061

[21] Appl. No.: 56,059

[22] Filed: Jul. 9, 1979

[51] Int. Cl.³ .......................... H04N 1/12; H04N 1/18
[52] U.S. Cl. .................................... 358/286; 358/213; 358/285; 358/293; 358/294
[58] Field of Search ............... 358/901, 285, 286, 293, 358/294, 213

[56] References Cited

U.S. PATENT DOCUMENTS

| 1,751,584 | 3/1930 | Hansell | 358/901 |
| 3,235,660 | 2/1966 | Treseder | 358/294 |
| 3,318,996 | 5/1967 | Garfield | 358/294 |
| 3,518,699 | 6/1970 | Mitchell | 358/293 |
| 3,644,931 | 2/1972 | Stringer | 346/139 R |
| 3,899,035 | 8/1975 | Rothgordt | 358/286 |
| 3,956,587 | 5/1976 | Nelson | 358/286 |
| 4,149,091 | 4/1979 | Crean | 358/293 |

Primary Examiner—Howard W. Britton
Attorney, Agent, or Firm—Donald C. Feix

[57] ABSTRACT

A linear array of optical sensing elements is moved transversely to the relative motion of an optical image such that each element can sense the optical density of pixels over which is passes, and such that all pixels in each of successive rasters across the image are sensed by at least one optical sensing element.

The linear array of optical sensing elements may be combined with a linear array of printing elements in a single moving head to share components and thus to reduce cost of a facsimile transceiver.

10 Claims, 7 Drawing Figures

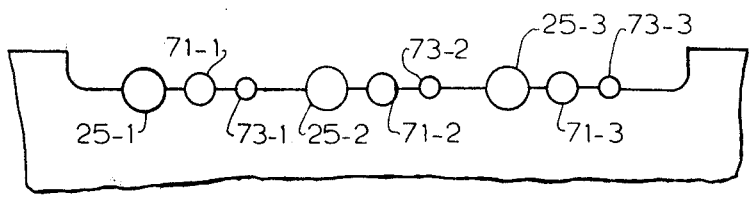
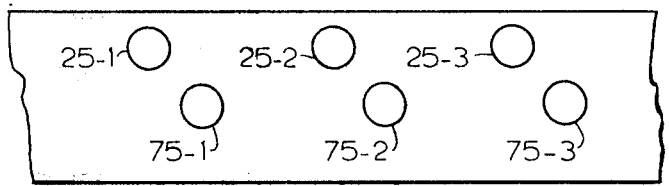
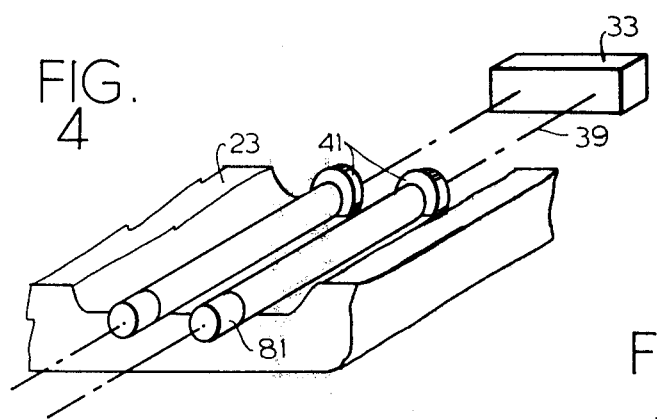
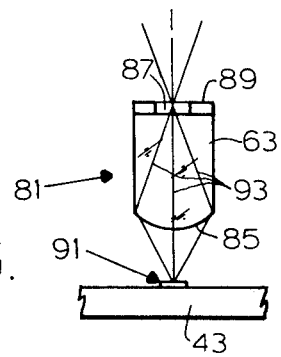
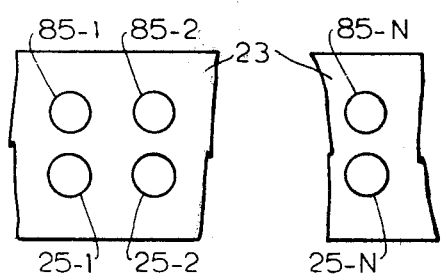
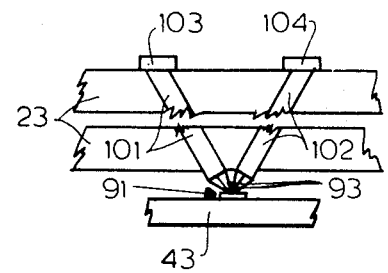
FIG. 2
FIG. 3
FIG. 4
FIG. 5
FIG. 6
FIG. 7

APPARATUS FOR DIGITIZING OPTICAL IMAGES

FIELD OF THE INVENTION

This invention relates to systems wherein an optical image such as a photograph or printed document is "digitized" for applications such as image processing, facsimile transmission, and/or storage.

This invention also relates to non impact printing means using a non impact moving head to print on non impact media; and further to a combination of said scanning head and said printing head, as for a facsimile transceiver, which share common elements to reduce cost.

BACKGROUND OF THE INVENTION

The use of digital techniques for defining optical images is increasing rapidly in many fields including facsimile transmission, computer graphics, image enhancement, etc.

Optical images to be digitized are divided into a number of picture elements, called pixels, and a digital value representing its tonal value is assigned to each. These tonal values are then assigned positions on a gray scale into which the full range of optical densities comprising the image may be divided. Black and white images have a gray scale of two steps, and black is usually assigned a binary one, while white is a binary zero. Eight shades of gray require three binary bits as shown in table 1.

TABLE 1

| Gray Level | Binary Value |
|---|---|
| 1 | 000 |
| 2 | 001 |
| 3 | 010 |
| 4 | 011 |
| 5 | 100 |
| 6 | 101 |
| 7 | 110 |
| 8 | 111 |

The pixels in an image may be organized into a series of horizontal rows called rasters, each raster being one pixel wide. The rasters are then scanned successively by light sensing elements which, in cooperation with associated electronics, digitize the optical density of each pixel in turn to produce a series of binary digits which define the image.

Auxiliary electronics generate control codes which show where each raster begins, where the image ends, etc.

The complete bit stream, sometimes called a "bit map" may be stored in a computer memory, processed by a computer, or transmitted to a printer which can print each pixel in its proper gray scale value to reproduce the original image or an interpretation of it. This invention describes a practical and relatively low cost means of producing accurate bit maps and printing means for reproducing them.

A basic requirement for a digitizer is that a light sensing element be positioned to sense the tonal value of each pixel.

This may be done with any of a variety of "flying spot" scanners where a spot of light the size of a single pixel scans successive rasters and the light reflected from each pixel is sensed.

It may also be done by focusing successive rasters of pixels onto a linear array of sensors with a separate sensor for each pixel. The pixels can then be scanned electronically at very high rates. This technique is used in some facsimile transceivers, but the cost of the arrays is very high since each of as many as 1,728 elements must be perfect and the yield is low.

The present invention produces low cost facsimile transceivers which can be used in the home for transmission and reproduction of written messages by telephone. Here a large part of the cost is in the scanning head at the transmitter, and the printing head at the receiver.

The present invention reduces scanning head cost by using a reciprocating array of sensors wherein each sensor scans a column of pixels. In one example for a facsimile scanner, the 1,728 elements required for a fixed array are replaced by 64 elements in a reciprocating array. Here each element scans a column 27 pixels wide and the 64 elements together scan the full 1,728 pixels.

In a scanner for digitizing drawings 72" wide, 14,400 sensors can be replaced for a linear array of 144 sensors scanning 100 pixels each. Cost savings are substantial.

My copending U.S. application Ser. No. 024,608 describes a printing machine having a shuttle mechanism for moving a printing head which is similar to the mechanism for moving the scanning head of the present invention.

In one specific embodiment of this invention optical fibers of the scanner are used with appropriate light sources and controls to print on photosensitive media, and the same fibers are used at different times for scanning or printing.

In another embodiment a similar array of fibers are added, in parallel to those of the scanner, to print on photosensitive or photoconductive media.

In still further embodiments arrays of any type of non-impact printing styli are added in parallel with the scanning fibers to print on any appropriate non-impact medium. Wire styli may be used to print on dielectric media, on electrosensitive media, on thermal or electrolytic media. Magnetic heads may be used to print on magnetic media, etc.

With this printing means combined in a single moving head with the scanning means described earlier in this application, the present invention provides an effective and inexpensive facsimile transceiver which can be used at one time for digitizing an image to be transmitted and at another time for printing an image which has been received.

SUMMARY OF THE INVENTION

The present invention incorporates a novel sensing head with associated mechanism and electronics.

In a specific embodiment, the sensing head has one or more linear arrays of optical fibers, each fiber having a light sensor at one end; the other end being close to, or actually touching an image to be digitized. The fiber diameter is such that it covers the area of a single pixel.

The fibers are mounted in and uniformly spaced in a linear array, at intervals of more than one fiber diameter, in a frame which can be reciprocated a distance of at least one fiber interval. As the head is reciprocated, each fiber passes in turn over all of the pixels in the interval between its starting point and the starting point of the next fiber in the array. The sensor attached to the fiber is polled as the fiber passes each pixel to register the tonal value of that pixel.

In this manner, the outputs from all of the fibers in the scanning array represent the tonal values for all of the pixels in a single raster.

The image is then moved one raster (pixel) width and the process repeated. Appropriate electronics permit polling during both directions of scan.

In this specific embodiment, as summarized above, the head is used both for sensing and for printing. In the sensing mode the fibers are operatively associated with a light-sensing element. In the printing mode the fibers are operatively associated with a light-emitting element. Certain light emitting diodes have this dual capability of operating either as a sensor or as a light emitter.

In another specific embodiment of the present invention an additional array of printing styli are added in parallel with the scanning fibers in the movable head to act as printing means. The scanning and printing means thus share the same mechanism. As a result, an effective and inexpensive facsimile transceiver is produced by the present invention and can be used at one time for digitizing an image to be transmitted and at another time for printing an image which has been received.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 2 is an end view, taken along the line and in the direction indicated by the arrows 2—2 in FIG. 1, showing optical fibers having different diameters arranged in a linear array for producing electrically selectable pixel sizes appropriate for each application.

FIG. 3 is another end view, like FIG. 2, but showing two rows of scanning fibers for scanning two rasters during a single pass of the head means for increasing scanning speed.

FIG. 4 is an isometric view, looking from the image side of FIG. 1, and a lens system substituted for the optical fibers of FIG. 1.

FIG. 5 is an axial cross section showing a detail of one form of a lens system of FIG. 4.

FIG. 6 is an end view, like FIG. 2, but showing a scanning head and a printing head combined to share mechanism and structure.

FIG. 7 is a fragmentary view of another embodiment of the present invention. FIG. 7 shows a separate fiber for each scanning fiber for illuminating each pixel as it is scanned.

DETAILED DESCRIPTION OF THE PREFERRED EMBODIMENT

Figure 1:
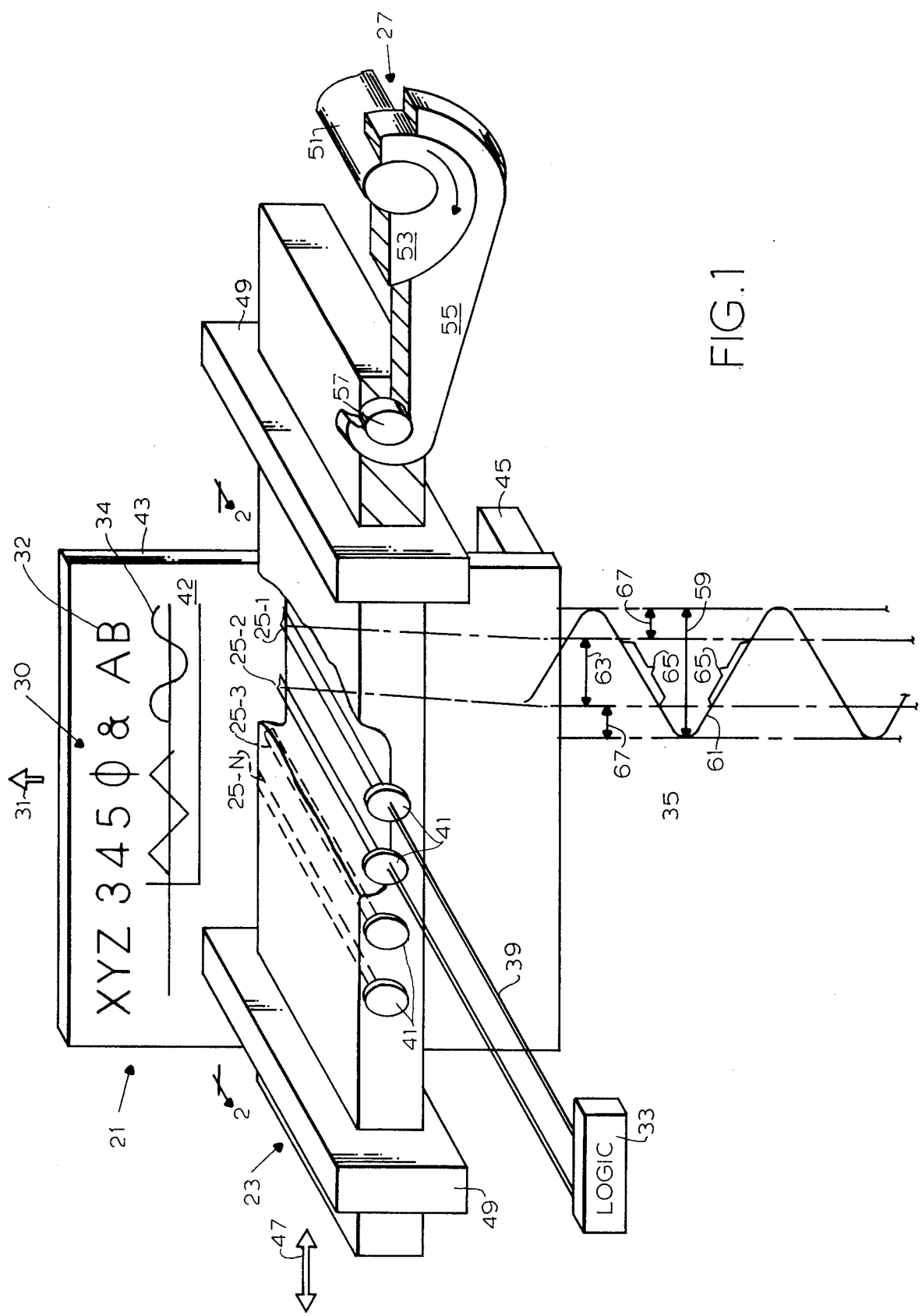
FIG. 1 is an isometric view, partly broken away and in cross section to show details of construction, of a scanning head means for sensing the optical density of an image and constructed in accordance with one embodiment of the present invention.

One embodiment of a scanning apparatus constructed in accordance with the present invention is indicated generally by the reference number 21 in FIG. 1.

The scanning apparatus 21 shown in FIG. 1 has a scanning head 23. The scanning head 23 has a linear array of individual optical fibers 25-1, 25-2, 25-3, 25-N, each having a sensing means 41.

The scanning apparatus 21 also comprises a reciprocating mechanism 27 for reciprocating the head 23 and the linear array of fibers 25 to scan a raster pattern on an image 30, displayed on the surface 42 of the medium 43. Numeral 32 indicates a typical alphanumeric image; numeral 34 indicates a typical graphics image. Medium 43 is mounted on a support 45 which can be driven, by means not shown in FIG. 1, to move image 30 past the scanning head 23 in the direction shown by arrow 31. This movement may be in steps one pixel wide so that each traverse of the head 23 covers a single raster of pixels, or the movement may be continuous.

The scanning apparatus 21 also includes control means 33 for polling selected ones of sensors 41 to sense the optical density of the pixel seen by each fiber at the time of polling.

FIG. 1 includes a timing diagram 35 which shows the relationship of the reciprocation of styli 25 to the movement 31 of the image 30. The image 30 on the medium 43 may be mounted on a rotatable drum or on a flat table.

In the particular embodiment shown in FIG. 1, the control 33 comprises logic which polls sensors 41 and digitizes their outputs.

The sensing means 41 may be any of several photosensitive devices such as photo cells, charge coupled diodes (CCDs), light emitting diodes (LEDs), etc.

LEDs have the interesting capability of sensing light intensity as well as emitting light (not simultaneously). This means that a single head using such LEDs may be used for both sensing an optical image and, at another time, printing on a light sensitive medium by merely switching electronics.

This capability makes it feasible to use a single head for either scanning or printing, as in a facsimile transceiver, where an image is digitized at one location and printed on a photosensitive medium at another location.

As illustrated in FIG. 1, the head 23 is mounted for reciprocation, in the direction indicated by the arrow 47, within guides 49.

In one specific embodiment of the present invention as illustrated in FIG. 1, the drive mechanism 27 for producing the reciprocation of the head 23 comprises a rotating shaft 51, an eccentric 53, a connecting rod 55 and a wrist pin 57.

The timing diagram 35 illustrates the relative motion between the medium 43 and a particular fiber 25-2.

The total distance of travel of the fiber 25-2 is indicated by the arrow 59 in the timing diagram 35. This total travel 59 represents 360° of rotation of the drive shaft 51. The path 61 traced by the stylus 25-2 with respect to the movement of the medium 43 is generally sinusoidal when the medium 43 is moved continuously, rather than in stepped increments. The total travel 59 is made up of a central, scanning interval 63 corresponding to the portions 65 of the trace 61. The portion 65 of the trace 61 is, as is apparent from FIG. 1, substantially linear.

The total travel 59 also comprises end portions 67 which constitute overtravel. During this overtravel the fibers 25 are not polled. Also during the time represented by the overtravel 67 at each end of the reciprocating movement, the medium 43 may be stepped (if a step sequence rather than a continuous movement of the medium 43 is utilized). During these same intervals 67, the movement of the head 23 is decelerated and accelerated at each end of the reciprocation stroke as the direction of travel up the head 23 is reversed.

Another embodiment of the present invention is shown in FIG. 2 end view. In the FIG. 2 embodiment additional fibers are positioned between the fibers 25-1, 25-2, 25-N, etc. The additional fibers have diameters different from the fibers 25. Thus, fibers 71-1, 71-2, 71-3, etc., are all of the same diameter but have a diameter smaller than the diameter of the fibers 25. Fibers 73-1, 73-2, 73-3, etc., are all of the same diameter but have a diameter smaller than the diameter of the fibers 71. Polling of these additional fibers is electrically selectable by the control 33 to produce a pixel size appropriate for each application.

In another embodiment, the sensing head uses small lens systems instead of optical fibers. Such systems may be economically produced by molding.

FIG. 4 shows one form of lens systems 81 substituted for the optical fibers in FIG. 1.

FIG. 5 details schematically the construction of one form for the lens system 81. Here a cylindrical body 63 is molded with a spherical lens element 85 on one end. A masking aperture 87, which defines the pixel size, on the other end is formed by making a ring 89 opaque. The light reflected by the pixel 91 is imaged at the aperture 87 which defines the boundaries of the pixel 91. Light, from the pixel 91, as shown by rays 93 passing through the aperture 87 is sensed by the sensor 41 as was done for light transmitted by the optical fibers described above.

As shown in FIG. 6, the scanning apparatus of this invention may be combined with any of the non-impact printing apparatus of co-pending U.S. patent application Ser. No. 024,608 to produce a low cost facsimile transceiver where the scanner and printer share much of the mechanism. Here printing styli 85-1, 85-2, 85-N are added to the head means 23 in a row parallel to the sensing fibers 25-1, 25-2, 25-N to permit printing on a non-impact medium.

A single scanning apparatus of this invention may also serve the dual purpose of scanning and printing by use of a photosensitive material as a printing medium. Here the optical fiber has a sensing means for use in scanning, and a modulatable light source for printing. Certain LEDs can serve this dual purpose.

The Image 29 must be illuminated during the scanning mode. This may be done either by flooding the raster with light, or by use of one or more illuminating elements associated with each scanning element.

FIG. 7 shows a fiber 101 with an associated sensor 103 disposed to scan a pixel 91 of an image 30 which is illuminated by a fiber 102 with an associated light source 104. The fibers in this case may be graded index fibers which can be designed to focus on a small spot a short distance from their ends. Here either or both of the fibers may define the pixel boundaries.

The lens elements of FIG. 5 may be substituted for either the fiber 101 or the fiber 102 or for both.

The scanning apparatus of this invention is particularly cost effective when scanning relatively wide images—over twelve inches—which are awkward to scan with lasers and other flying spot scanners.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. An image scanning apparatus of the kind in which optical elements scan an optical image to indicate the optical densities of pixels of the optical image, said apparatus comprising, scanning means including an array of optical elements in one or more rows, head means for holding the optical elements in a fixed spatial relationship to each other, means for moving the head means with respect to an optical image to scan a raster pattern on the image, and drive means for moving the optical image relative to the array of optical elements to scan successive rasters of the image and wherein the array of optical elements comprises a linear array and wherein the center of each optical element is evenly spaced from an immediately adjacent optical element by at least one element diameter, and wherein the head means are moved at least through the distance between adjacent optical elements so that the optical elements scan all, or any part, or a full raster line of pixels across an optical image.

2. An image scanning apparatus of the kind in which optical elements scan an optical image to indicate the optical densities of pixels of the optical image, said apparatus comprising, scanning means including an array of optical elements in one or more rows, head means for holding the optical elements in a fixed spatial relationship to each other, means for moving the head means with respect to an optical image to scan a raster pattern on the image, and drive means for moving the optical image relative to the array of optical elements to scan successive rasters of the image and wherein the optical elements are constructed to define different size pixels so that the sizes of pixels being scanned can be determined by electrically selecting an appropriate optical element.

3. An image scanning apparatus of the kind in which optical elements scan an optical image to indicate the optical densities of pixels of the optical image, said apparatus comprising, scanning means including an array of optical elements in one or more rows, head means for holding the optical elements in a fixed spatial relationship to each other, means for moving the head means with respect to an optical image to scan a raster pattern on the image, and drive means for moving the optical image relative to the array of optical elements to scan successive rasters of the image and wherein the array of optical elements are disposed in multiple rows with all rows being simultaneously operable for scanning to increase the speed of the scanning operation.

4. An image scanning apparatus of the kind in which optical elements scan an optical image to indicate the optical densities of pixels of the optical image, said apparatus comprising, scanning means including an array of optical elements in one or more rows, head means for holding the optical elements in a fixed spatial relationship to each other, means for moving the head means with respect to an optical image to scan a raster pattern on the image, and drive means for moving the optical image relative to the array of optical elements to scan successive rasters of the image and wherein the drive means move the medium continuously at a uniform rate and including second means for moving the head means in the same direction and at the same rate as the medium during the scanning interval and for also moving the head back to the starting point at the beginning of a raster during the time spent outside the scanning area.

5. An image scanning apparatus of the kind in which optical elements scan an optical image to indicate the optical densities of pixels of the optical image, said apparatus comprising, scanning means including an array of optical elements in one or more rows, head means for holding the optical elements in a fixed spatial relationship to each other, means for moving the head means with respect to an optical image to scan a raster pattern on the image, and drive means for moving the optical image relative to the array of optical elements to scan successive rasters of the image and wherein the head means hold the elements in a linear array and said means for moving the head means are reciprocating means which reciprocate the head means at least the distance between adjacent elements and wherein the drive means are constructed to utilize the time spent outside the scanning area to step the medium and to accelerate and decelerate the reciprocating motion of the head means.

6. An image scanning and printing appparatus of the kind in which optical elements scan an optical image to indicate the optical density of pixels of the optical image and individual printing elements are selectively energizable to produce a pattern on a sensitive medium, said apparatus comprising, scanning means including an array of scanning elements in one or more rows, printing means including an array of printing elements in one or more rows, head means for holding the scanning elements and the printing elements in a fixed spatial relationship to each other, means for moving the head means with respect to a medium to scan a raster pattern on the medium, drive means for moving the medium relative to the array of scanning elements and printing elements to scan successive rasters on the medium, and wherein the head means comprise a single head which holds both the scanning elements and the printing elements so that the scanning and printing elements share a common raster producing mechanism.

7. The invention defined in claim 6 wherein the scanning means and the printing means comprise a row of fiber elements with each fiber element in the row functioning as a scanning element in a scanning mode and functioning as a printing element in a printing mode.

8. The invention defined in claim 6 including a first linear array of scanning elements and a second linear array of printing elements.

9. The invention defined in claim 8 wherein the linear array of scanning elements comprise fibers and wherein the linear array of printing elements comprise wire stylii.

10. The invention defined in claim 8 wherein the linear array of scanning elements comprise scanning fibers and wherein the linear array of printing elements comprise printing fibers.

* * * * *